United States Patent [19]

Hesse et al.

[11] 4,137,424

[45] Jan. 30, 1979

[54] RAIL FOR SUPPORTING ELECTRICAL FIXTURES

[75] Inventors: Kurt Hesse; Karl Wehling; Alfred Staff, all of Lemgo, Fed. Rep. of Germany

[73] Assignee: Staff KG, Lemgo, Fed. Rep. of Germany

[21] Appl. No.: 790,732

[22] Filed: Apr. 25, 1977

[30] Foreign Application Priority Data

Apr. 26, 1976 [DE] Fed. Rep. of Germany ... 7612998[U]

[51] Int. Cl.[2] ........................ H02G 5/04; H02G 3/04; B60M 1/34; H01R 9/00

[52] U.S. Cl. .................................... 174/97; 174/99 B; 191/23 A; 339/14 R; 339/21 R

[58] Field of Search ..................... 174/48, 68 C, 70 C, 174/72 C, 95, 97, 99 R, 99 B; 339/14 R, 20, 21 R, 21 S, 22 R, 22 B, 22 T, 23, 24; 191/23 A

[56] References Cited

U.S. PATENT DOCUMENTS 3,012,217 12/1961 Pantin ................................ 339/21 R 3,347,392 10/1967 Gonyea .............................. 174/97 X

FOREIGN PATENT DOCUMENTS 2311614 9/1973 Fed. Rep. of Germany ........ 339/22 R 1501476 10/1967 France ....................................... 174/48

*Primary Examiner*—Laramie E. Askin

*Attorney, Agent, or Firm*—Pollock, Vande Sande & Priddy

[57] ABSTRACT

A supporting rail for supporting electrical fixtures or the like. The device comprises an extruded plastic elongate member which is formed at least in part by spaced inner and outer walls that are joined at spaced locations about the cross-sectional periphery of the member. The spaced walls define therebetween longitudinally extending hollow channels for carrying wires or the like, and the inner wall encloses an elongate inner chamber which is open along its length. A structurally rigid rail is thus provided but without requiring the use of substantially solid construction in the extruded rail.

3 Claims, 1 Drawing Figure

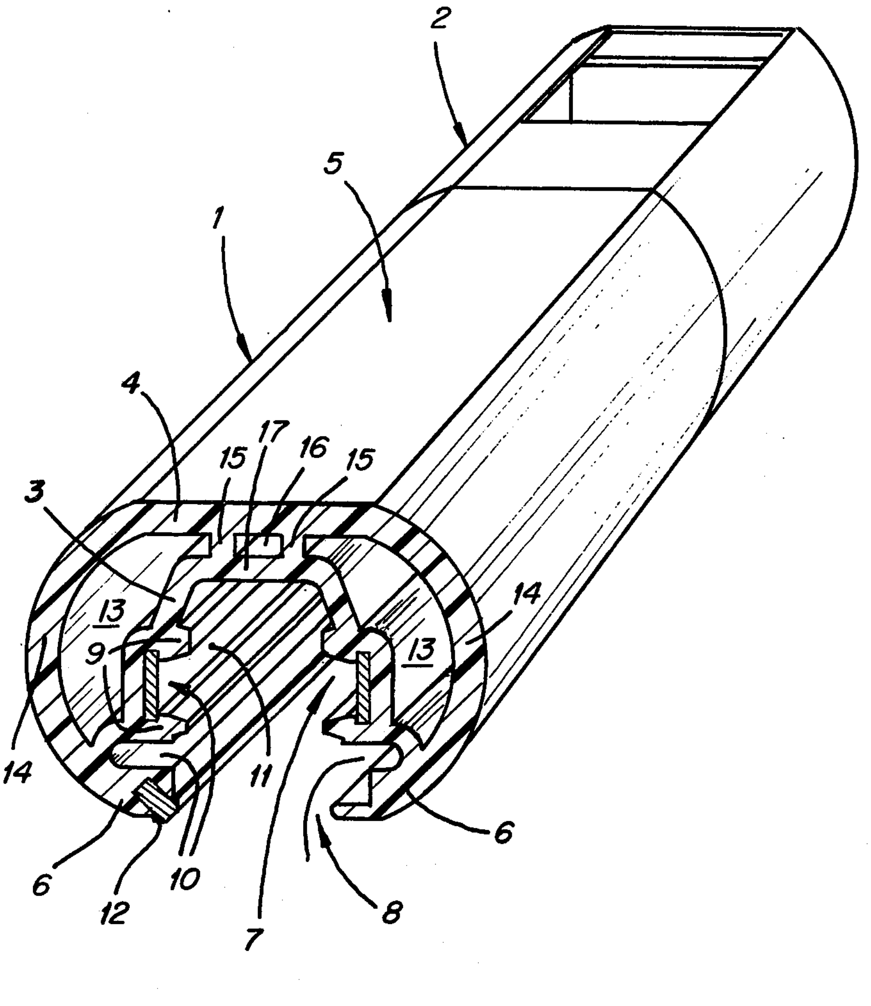
2
5
1
4
17
16
15
15
3
13
13
14
9
14
11
10
6
6
12
7
8

RAIL FOR SUPPORTING ELECTRICAL FIXTURES

BACKGROUND OF THE INVENTION

The invention relates to a plastic rail of the type which supports electrical fixtures. The rail comprises an extruded member whose cross-section includes longitudinal projections and recesses into some of which electrical connectors are inserted while others support suspended electrical fixtures.

Prior art plastic fixture rails of this type are generally formed with a solid cross-section provided with metal strips to provide increased strength. On the one hand, large masses of plastic are undesirable, not only because of the increased cost of material but also because of the incalculable contraction of the plastic during hardening after extrusion. Furthermore, the metal strips used in such devices contribute considerably to the expense of the known plastic light rails.

Other plastic fixtures rails are known which have embedded conductors, whereby the whole is fitted to metal rails. With these, the metal profile constitutes the supporting element, and the plastic rail serves merely as insulation for the conductors.

SUMMARY OF THE INVENTION

The purpose of the invention is to provide a plastic fixture rail in which the plastic profile serves not only to insulate the conductors, but also acts as the supporting element. This result is achieved, according to the invention, on a plastic fixture rail of the type discosed, by means of an inner wall enclosing a longitudinally open chamber, with projections and recesses formed on the inner wall and extending towards the chamber, and by means of an outer wall surrounding and spaced from the inner wall, longitudinal hollow spaces being formed between the inner and outer walls.

The particular advantage of the new plastic fixture rail is that because of the double walls which may be interconnected at several positions, an especially strong torque and load resistant plastic profile is achieved without heavy concentration of material. The spaces formed between the inner walls and the outer walls of the plastic light rail can be used for running additional electrical wires; furthermore, the distance between the outer wall and the inner wall considerably increases the insulation, especially at the joints. The new light rail is thus especially suitable for an embodiment which is safety-insulated.

Further advantages of the invention are apparent from the claims and from the following description.

BRIEF DESCRIPTION OF THE DRAWING

In describing the invention, reference will be made to the accompanying drawing which shows in perspective a section through a plastic fixture rail according to the invention.

DETAILED DESCRIPTION OF THE PREFERRED EMBODIMENT

In the drawing a fixture rail 1 is shown which is joined at the rear end to a connecting means 2 not shown in detail. For better illustration, the fixture rail 1 is sectioned at the front end.

The fixture rail 1 comprises an extruded hollow plastic profile. An inner wall 3 is surrounded at a distance by an outer wall 4. The inner wall 3 contains an inner chamber 7 which has a longitudinal opening 8. The inner wall 3 has a generally U-shaped section with a flattened base 17 opposite the opening 8, and side parts profiled to a greater or lesser extent with projections 9 and recesses 10. The projections 9 and the recesses 10 on the inner wall 3 are directed inwardly into the chamber 7, whereby of course, the outside of the inner wall 3 is also very uneven. The recess 10, for example, serves as a form-fitting retaining means for electric lamps or the like which are to be connected to the fixture rail. Also, the recesses 10 contain conductors 11 and a grounding strip 12, which are separated from each other by sufficiently large air and surface distances around the projections 9.

The outer wall 4 has a generally C-shaped appearance with a flattened back 5. The flattened back 5 serves for example for placement on a ceiling so that the fixture rail can be connected rigidly by means of suitable securing elements to a ceiling of to a wall. Curved sides 14 of the outer wall 4 extend from the flat back 5 to the longitudinal edges 6 which can themselves be profiled, and via which the outer wall 4 is connected to the inner wall 3 near the opening 8.

Between the curved sides 14 of the outer wall 4 and the side parts of the inner wall 3 is a greater or lesser distance, so that between the two walls enclosed hollow spaces 13 are created within the fixture rail 1. By means of the double walls 3 and 4, which can be further connected and supported mutually by stays 15, an especially load and torque resistant construction is achieved. Electrical wiring can be carried in the hollow spaces 13, for which otherwise special channels would be necessary. Finally, because of the double wall embodiment of the fixture rail, the distance from the conductor to the outside is considerably increased, so that, especially at the joints, the necessary spacing of conducting parts to the outside is easily achieved.

Suitably, the whole profile of the fixture rail 1 is symmetrically formed. In the embodiment of the present example, the plane of symmetry extends longitudinally centrally through the chamber 7 and the opening 8. The two curved sides of the outer wall 4 lie as if mirrored on this plane of symmetry whereas the profiled sides of the inner wall 3 do not conform exactly to a strict symmetry. The symmetrical curves 14 of the outer wall 4 also provide an optical advantage because despite the irregular profile of the inner wall 3, the visible parts of the outer wall 4 have a smooth surface.

The inner wall 3 is connected in the vicinity of its flat base 17 to the back 5 of the outer wall via ribs 15 which are also arranged symmetrically about the longitudinal central plane of the fixture rail. The two ribs 15 enclose between them a central hollow chamber 16 which is of significance in the securing of the fixture rail 1. When the securing elements are passed through the inner wall 3 and the outer wall 4 in the vicinity of the central hollow chamber 16 for securing the fixture rail 1, a double support and better guiding of the securing elements is achieved.

What we claim is:

1. A supporting rail for supporting electrical fixtures of the like comprising:

an extruded plastic elongate member formed at least in part by spaced inner and outer walls which are joined at spaced locations about the cross-sectional periphery of said member, siad inner wall enclosing an elongate inner chamber having an opening along its entire length, said outer wall being of generally C-shaped cross-section and including a flattened surface portion opposite the opening in said inner chamber, said spaced walls defining therebetween longitudinally extending hollow channels extending substantially about said periphery of said member, with said outer wall merging with said inner wall adjacent the opening in said inner chamber, said inner wall forming at least one elongate recess and at least one elongate projection over the length of said member for supporting electrical conductors and connecting elements of fixtures intended to be suspended from said member.

2. The rail of claim 1 in which said spaced walls and the hollow channels defined thereby are symmetrically disposed about a central plane passing through said inner chamber.

3. The rail of claim 1 in which said inner wall has a flattened portion lying opposite but spaced from said flattened surface portion of said outer wall, and ribs interconnecting the respective flattened portions of said inner and outer walls.

* * * * *